United States Patent

[11] 3,574,489

[72] Inventor Michel A. Pierrat
Andover, Mass.
[21] Appl. No. 813,652
[22] Filed Apr. 4, 1969
[45] Patented Apr. 13, 1971
[73] Assignee Compudrive Corp.
Boston, Mass.

[54] ORBITAL DRIVE AND FLUID MOTOR INCORPORATING SAME
17 Claims, 23 Drawing Figs.
[52] U.S. Cl. ................................................ 418/61, 74/804, 418/171, 418/210
[51] Int. Cl. .................................................. F01c 1/10, F01c 11/00, F16h 1/28
[50] Field of Search ............................................. 103/130, 161; 230/145; 91/56; 123/8 (G0K)); 74/804, 805; 417/199, 204; 418/61, 171, 210

[56] References Cited
UNITED STATES PATENTS

| | | | |
|---|---|---|---|
| Re26,383 | 4/1968 | Huber | 91/56 |
| 2,108,384 | 2/1938 | Moisy | 74/804 |
| 2,667,089 | 1/1954 | Gregory | 74/804 |
| 2,972,810 | 2/1961 | Menge, Sr. | 74/804 |
| 3,304,808 | 2/1967 | Grant | 74/804 |
| 3,459,367 | 8/1969 | Pfaff et al. | 230/145 |

Primary Examiner—Carlton R. Croyle
Assistant Examiner—Wilbur J. Goodlin
Attorney—Thompson & Mrose ABSTRACT: An orbital drive for delivering high torque at low speed ratios comprises two pairs of meshed gears, each pair including an inner externally-toothed gear and an outer internally-toothed orbiting gear arranged to orbit in an eccentric path around its mate. One of the inner gears is stationary and the other is mounted on an output shaft. The orbiting gears are connected to orbit together around the output shaft axis, and may be formed in a common blank. A rotatable ring, concentric with the output axis, has eccentric driving relation with the orbiting gears. This driving relation may be established by peripheral engagement of these gears in an opening in the ring eccentric to the output axis. The ring member may serve as an input drive to produce orbital motion of the orbiting gears and thereby drive the output shaft, and may be driven mechanically, hydraulically, or electrically. The orbital drive may also serve as an hydraulic or pneumatic motor, pump, or brake, in which the mating gear teeth form expansible chambers to which working fluid is commutatively directed by ports formed in the ring member. Two or more of these orbital drives may be coupled to a common output shaft and a common input drive to provide added torque transmission capability; their respective orbiting gears are preferably phased apart equiangularly to relieve the output shaft of bending loads.

INVENTOR
MICHEL A. PIERRAT
BY
Thomson, Mrose, & Ericson
ATTORNEYS

PATENTED APR 13 1971 3,574,489

INVENTOR
MICHEL A. PIERRAT
BY
Thomson, Mrose & Ericson
ATTORNEYS

INVENTOR
MICHEL A. PIERRAT
BY
Thomson, Mrose & Ericson
ATTORNEYS

PATENTED APR 13 1971  3,574,489

INVENTOR
MICHEL A. PIERRAT
BY
Thomson, Mrose & Ericson
ATTORNEYS

INVENTOR
MICHEL A. PIERRAT

ORBITAL DRIVE AND FLUID MOTOR INCORPORATING SAME

BACKGROUND OF THE INVENTION

The development of a constant-ratio rotary gear drive in which internally- and externally-toothed gears form continuous rolling contact between their mating teeth has been the subject of continuing effort for many years. The smoother delivery of power attainable through continuous rolling tooth contact would result in a gear drive which would wear less rapidly and transmit power more efficiently. A drive with this characteristic would also afford an efficient fluid pump or hydraulic motor, since continuous tooth contact would prevent fluid leakage from the pockets formed between each pair of adjacent teeth. Conventional involute gear teeth do not maintain the desired continuous tooth contact.

One direction taken by efforts to develop such gears is an orbital drive comprising a pair of gears in which an outer internally-toothed gear has one more tooth than an inner externally-toothed gear. The gears mesh with their axes eccentric to one another. It was first proposed to use cycloidal tooth curves for orbital drives, that is, curves generated by a point on the pitch circle of either gear tangent to and rolling on the pitch circle of the other gear. While this would theoretically afford continuous rolling contact, such curves have sharp, jointed cusps or teeth which are not practical because they cannot sustain the necessary tooth loads for any length of service, but wear very rapidly.

A later and more successful approach was described in U.S. Pat. No. 1,682,563, issued Aug. 28, 1928 to Myron F. Hill, in which teeth were generated on curves parallel to (i.e. enveloping equidistantly) a variety of cycloid termed a curtate trochoid. The latter is a curve generated by a point on a radius of a pitch circle, but outside the circle itself, when this circle rolls on the pitch circle of the mating gear. The teeth were cut by a circular milling cutter whose axis was moved along the curtate trochoid. It proved necessary to wear the teeth in by running mating gears together; therefore each set of internal gears was matched, and gears so formed were not interchangeable. At a later date, W. H. Nichols developed a method of tooth generation which does afford substantially continuous rolling contact and constant angular velocity, without requiring running in of individual gear sets to burnish them to a proper fit. Gears of this type are interchangeable. They are commercially available under the generic designation "gerotors" from the W. H. Nichols Company of Waltham, Massachusetts.

Orbital drives are characterized by a fixed speed ratio and a positive driving connection. If the internal and external gears are mounted for rotation on fixed but eccentric axes, the speed ratio is simply equal to the ratio of the number of teeth of the input gear to the number of teeth of the output gear. In conventional practice, the minimum numbers of teeth are 4 and 5 for the inner and outer gears, respectively, so that the extreme speed ratios are 4/5 or 5/4, and the speed ratio more nearly approximates unity as the number of teeth are increased. This type of mounting relationship is normally used for hydraulic pumps and motors rather than mechanical drives.

Another mounting relationship of the parts produces a very different speed ratio. If the outer gear is held stationary, and the inner gear is caused to orbit eccentrically around the axis of the outer gear, the inner gear rotates in a sense opposite to its orbital motion; the speed ratio of rotary to orbital motion is $1/n$, $n$ being the number of teeth of the inner gear. A slow-speed high-torque rotary output is thus obtained from a high-speed orbital input. The speed ratio may be analyzed generally as $1-N/n$, where $N$ is the number of teeth in the outer gear, and $n$ is the number of teeth in the inner gear; the ratio conforms to that of other epicyclic gear trains. The gear ratio is in itself $N/n$, but the output also partakes of the orbital input in an opposite rotational sense; thus the expression $1-N/n$. Since the difference in the numbers of teeth of the two gears is normally one, this expression may be written $1-(n+1)/n$, which is equivalent to $1/n$.

The inner-gear-orbiting type of driving arrangement has been utilized in such hydraulic power-amplifying devices as power steering, as described for example in U.S. Pat. No. 3,289,602 to Hudgens. A combined input-output shaft is connected by a nutating member and a universal joint to the inner gear of an orbital drive, so that this gear may orbit around the axis of the outer gear. A suitable commutating device is provided to direct a flow of pressure fluid selectively to the successively expanding pockets formed between the teeth of the orbital gear set to provide a power assist to the input-output shaft.

BRIEF DESCRIPTION OF THE INVENTION

It is the general object of the present invention to provide an improved orbital drive which makes available a wide selection of fixed-speed ratios ranging from about 4 to 1 up to at least 100,000 to 1, while utilizing only four gears. The improved orbital drive is highly compact but has a high torque-transmitting capacity, and is dynamically balanced. It features ease of manufacture, low cost, and minimal maintenance requirements.

It is a further object of the invention to provide an improved input drive means for an orbital drive mechanism, which does not involve rotating motion and is less subject to wear than previous input drive mechanisms, and which is more readily adaptable to various types of mechanical, hydraulic, or electrical input power supply.

It is still another object of the invention to provide an improved hydraulic or pneumatic motor, pump, brake, or speed control, incorporating an orbital drive.

Further objects and advantages of the invention will appear as the following description proceeds.

Briefly stated, a preferred embodiment of my improved drive incorporates a pair of externally-toothed inner gears each of which meshes with one of a pair of internally-toothed outer gears. The outer gears are drivingly interconnected, and are preferably formed from a single gear blank. One of the inner gears is fixed in a housing, and may be designated a reacting gear. The other inner gear is mounted on an output shaft for rotation on an axis concentric with the reacting gear. Unlike prior-art orbital drives of which I am aware, the outer gears, which are eccentric to the common axis of the reacting gear, output gear, and shaft, are caused to orbit about this axis.

The orbiting outer gears are supported eccentrically in a ring member which is rotatable concentrically with the output gear, reacting gear, and output shaft. The ring member has eccentric driving connection with the orbiting gears, such that rotation of the former accompanies orbital motion of the latter. In a preferred form, this driving connection is formed simply by means of an opening in the ring concentric with the orbiting gears but eccentric to the output shaft axis. This opening receives the peripheries of the orbiting gears in relatively rotatable relation, either forming a plain bearing therewith or having antifriction bearing means interposed.

If a rotational input drive is applied to the ring member, it produces orbital motion of the orbiting gears and rotation of the output gear and shaft. The output speed ratio of this orbital gear train is $1-(N3 \times N2/N4 \times N1)$, where $N1$ is the number of teeth of the output gear, $N3$ the teeth of the reacting gear, and $N2$ and $N4$ are the numbers of teeth of the orbiting gears meshing with the output gear and the reacting gear, respectively. If the sign of the resulting ratio is negative, then the output gear and shaft will turn in an opposite sense to the input ring; or if positive, the output shaft will have the same rotational direction as the input ring member. The nature of the foregoing relationship is such that a very wide range of speed ratios is available, from about 4 to 1 up to extremely high ratios of 100,000 to 1 or more; and this wide choice is achieved by the use of only four gears and an input ring member. The ring member may be driven mechanically, or by electric or hydraulic motors, and may itself comprise the rotor element of the drive motor. When a hydraulic drive motor is used, the ring may serve as a fluid distributor or port plate for controlling flow of pressure fluid to and from the motor.

The orbital drive gears may themselves form the expansible-chamber elements of an hydraulic motor, pump, or brake. The ring member may again serve as a distributor or port plate, for delivering pressure fluid to those chambers formed between the gear teeth which are in an expansion stage, and to exhaust fluid from those chambers which are contracting. Similarly, when the orbital drive is used as an hydraulic brake, and input power is supplied by other drive means, the ring member may serve as a port plate acting in cooperation with flow-restricting means for limiting the rate of flow from the contracting tooth chambers to those which are expanding, and thus limit the rate of rotation of the drive.

The ring member need not be eccentric to the orbiting gears, but may be concentric and partake of their orbital motion. In this case, the ring may not rotate with the orbiting gears, but merely oscillate to deliver the desired orbital drive motion to the orbiting gears. For example, such a ring may be oscillated by hydraulic pistons spaced about its circumference.

While the specification concludes with claims particularly pointing out and distinctly claiming the subject matter which I regard as my invention, it is believed that a clearer understanding will be gained from the following detailed description of preferred embodiments, referring to the accompanying drawings, in which:

Figure 1:
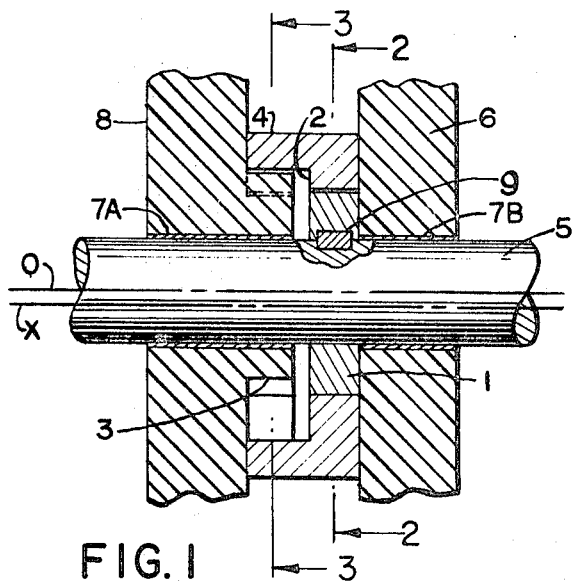
FIG. 1 is a fragmentary sectional view in side elevation showing the elements of an embodiment of the invention, but omitting a ring member to increase the clarity of the description.
Figure 2:
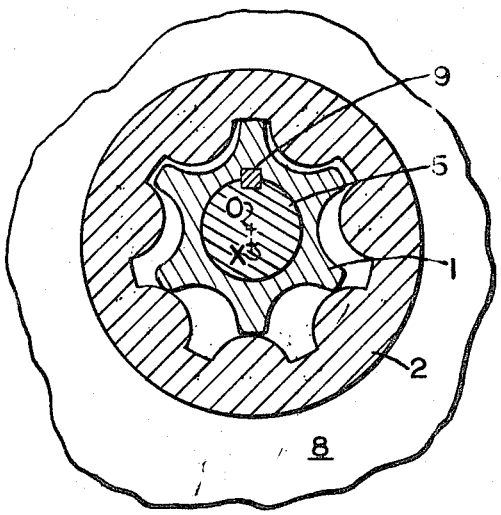
FIG. 2 is a sectional end view taken along line 2-2 in FIG. 1, looking in the direction of the arrows.
Figure 3:
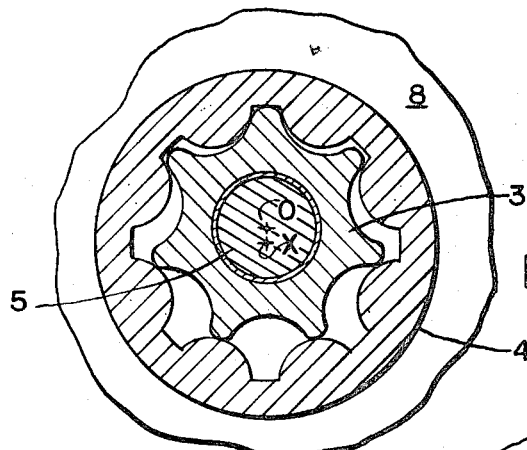
FIG. 3 is a sectional end view taken along line 3-3 in FIG. 1, looking in the direction of the arrows.

Referring to FIGS. 1—3, the improved orbital drive includes an inner reacting gear 3 having external teeth, inner output gear 1 having external teeth, and a pair of outer orbiting gears 2 and 4, which are formed from a single blank but may have different numbers of internal teeth. Each of the orbiting gears 2 or 4 would normally have one more tooth than that one of the inner gears 1 or 3 which meshes with it. The teeth are preferably so formed that they will maintain continuous rolling contact, and they may be of the Gerotor-type manufactured by the W. H. Nichols Company, as previously described. The outside diameter of each of the inner gears 1 or 3 is substantially equal to the diameter of the root circle of that outer gear 2 or 4 which meshes with it, less the height of one tooth. Consequently, the inner gears are received eccentrically in the outer gears, with the eccentricity equal to half of the tooth height.

The output gear 1 is fixed on an output shaft 5 by means of a key 9 or by other suitable means, and rotates therewith on the axis 0. The shaft 5 is rotatably mounted in housing elements 6 and 8 by means of bearings 7a and 7b, which are shown as plain bearings but may be antifriction, hydrodynamic, hydrostatic, or air bearings if desired. They may also incorporate thrust elements. The reacting inner gear 3 is fixed to the housing member 8, and is concentric with the shaft 5 on the axis 0. The outer orbiting gears 2 and 4 are free to orbit and also to rotate about the inner gears; their common axis X is eccentric to the axis 0, and will rotate in a circular path thereabout as the gears themselves follow orbital paths around this axis.

Orbital motion of the outer gears 2 and 4 produces rotation of the output shaft 5 with the overall speed ratio (per cycle of oscillation, i.e. per orbit, rather than per revolution of the outer gears) of $1-(N3 \times N2/N4 \times N1)$, where the numbers of teeth of the gears 1, 2, 3 and 4 are expressed as $N1$, $N2$, $N3$, and $N4$, respectively. In the illustrated example, the output gear 1 has six teeth and the meshing outer gear 2 has seven teeth, while the reacting inner gear has seven teeth and its meshing outer gear 4 is formed with eight teeth. Consequently, the speed ratio is equal to $-1/48$ that is, one complete orbit or oscillation of the outer gears produces 1/48 of a revolution of the output shaft. The sign of the speed ratio indicates the direction of rotation of the shaft 5 with respect to the orbital motion; if positive, these are in the same direction, or if negative, they are in opposite angular directions.

The speed ratio may be varied through a very wide range of values. By way of example, the combination in which $N1$ is 99, $N2$ is 100, $N3$ is also 100, and $N4$ is 101, results in the speed ratio of $1-(10,000/9,999)$, or $-1/9,999$. As another example, take $N1$ as 4, $N2$ as 5, $N3$ as 5, and $N4$ as 6 teeth; the resulting speed ratio is $1-25/24$, or $-1/24$. It should be borne in mind that the reacting gear 3 and output gear 1 should not have the same numbers of teeth, unless one set of meshing gears has a difference greater than one tooth. Equal numbers of teeth would result in a speed ratio of zero; that is, the output shaft 5 would not be moved by the orbital motion of the gears 2 and 4. Theoretically, ratios ranging from faster than 1/4 to slower than 1/100,000 can be achieved. The faster ratios are obtained by using small numbers of teeth in one gear set and large numbers in the other. The slower ratios are obtained by using large numbers of teeth in both gear sets.

Figure 4:
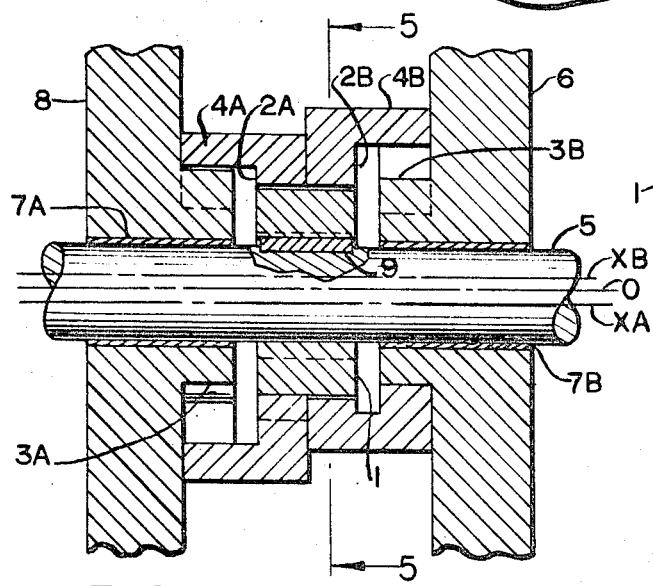
FIG. 4 is a fragmentary sectional view in side elevation showing a modified form of the orbital drive incorporating duplex sets of gears, and omitting a ring member.
Figure 5:
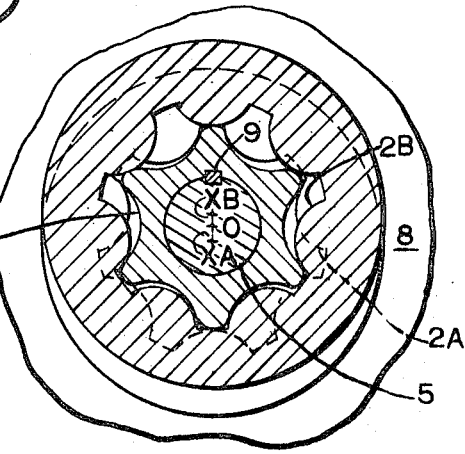
FIG. 5 is a sectional end view taken along line 5-5 in FIG. 4, looking in the direction of the arrows.

A modified gear arrangement is shown in FIGS. 4 and 5, involving duplex sets of gears. An elongated output gear 1 is driven in common by sets. Orbiting gears 2a and 4a cooperate with a reacting gear 3a, while a second pair of orbiting gears 2b and 4b cooperate with the reacting gear 3b. The reacting gears are fixed to the housing elements 8 and 6, while duplicate bearings 7a and 7b rotatably mount the shaft 5. It is preferred in this case that the orbiting gears 2a, 4a, and 2b, 4b, be positioned 180° out of phase with one another since this balances the bending loads acting on the shaft 5. The longitudinal axis of the gears 2b, 4b appears at xb in FIG. 5, while the axis of the orbiting gears 2a, 4a appears at xa. It will be observed in FIG. 5 that the tooth of the output gear 1 which appears at the top of the gear is fully engaged in the root between two teeth of the orbiting gear 2a, while the tooth of the gear 1 which is at the bottom of that gear is engaged in a root between teeth of the gear 2b. This duplex arrangement of gears not only increases the torque capacity of the unit, but also balances the bending loads applied to the shaft by the engagement of the teeth of the inner and outer gears.

Figure 6:
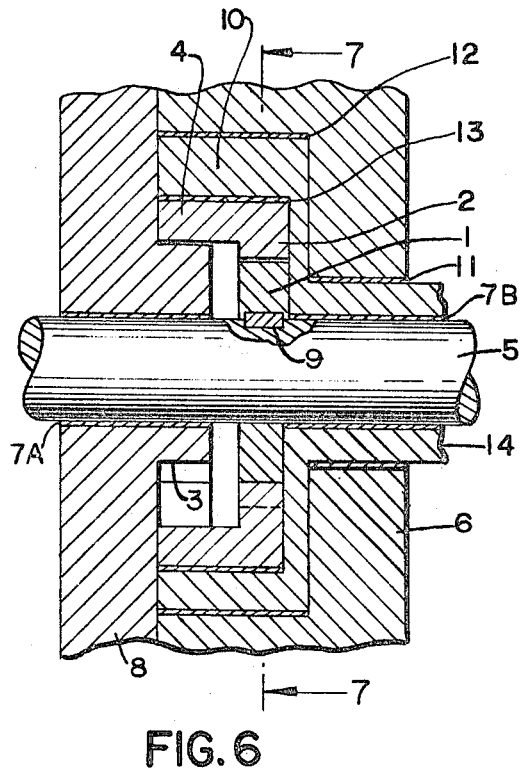
FIG. 6 is a fragmentary sectional view in side elevation of an embodiment of the improved orbital drive complete with a ring member having an input drive hub.
Figure 7:
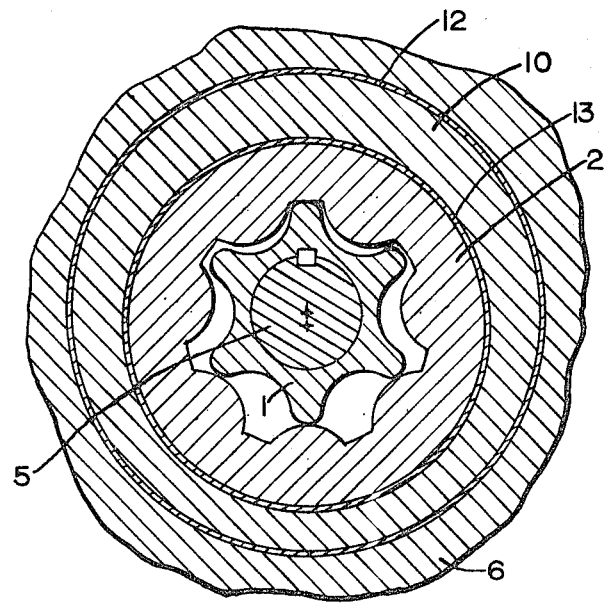
FIG. 7 is a sectional end view taken along line 7-7 in FIG. 6, looking in the direction of the arrows.

FIGS. 6 and 7 show the orbital drive in combination with a rotary mechanical power input. Parts similar to those of FIGS. 1—3 are similarly numbered. The orbiting gears 2 and 4 are mounted, preferably by means of a suitable annular bearing 13, within an eccentric circular socket in a ring member 10, which opening conforms to the concentric outer peripheries of the orbiting gears. The ring member 10 is in turn mounted in a circular opening in the housing member 6, preferably within a suitable annular bearing 12. The bearings 12 and 13 may be antifriction types like the bearings 7a and 7b and also incorporate thrust elements to prevent undue rubbing of the relatively rotating parts. The ring 10 and its bearing 12 are concentric with the axes of the shaft 5 and the output gear 1. The ring 10 is fixed to an annular input hub 14, which extends through an opening in the housing member 6 and has a suitable bearing 11 rotatably supporting the hub in this housing.

Rotation of the hub 14 and ring 10 produces oscillatory orbital motion of the gears 2 and 4, as previously described in relation to FIG. 1. This orbital motion results in output rotation of the gear 1 and the shaft 5. It will be apparent that each rotation of the ring member 10 produces one complete orbital oscillation of the gears 2 and 4, so that the rotational speed ratio of the input hub 14 to the output shaft 5 is in accordance with the aforementioned formula.

Figure 8:
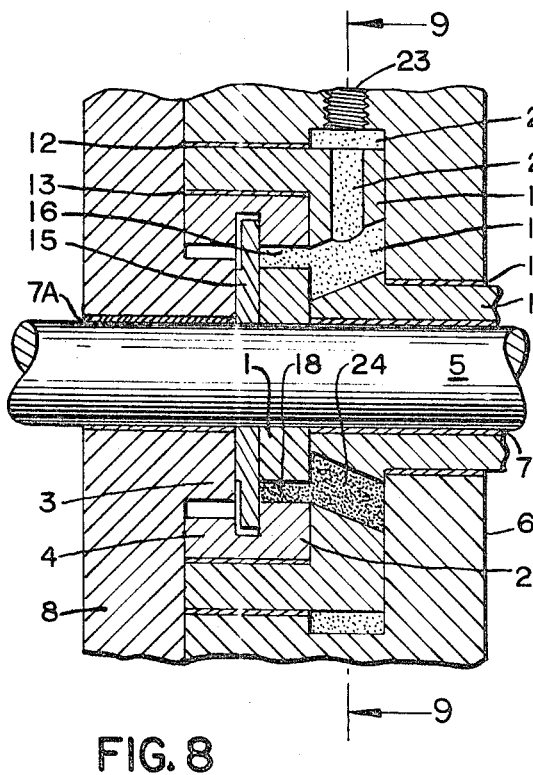
FIG. 8 is a fragmentary view in side elevation showing an embodiment similar to that of FIG. 6, but incorporating hydraulic speed control and braking.
Figure 9:
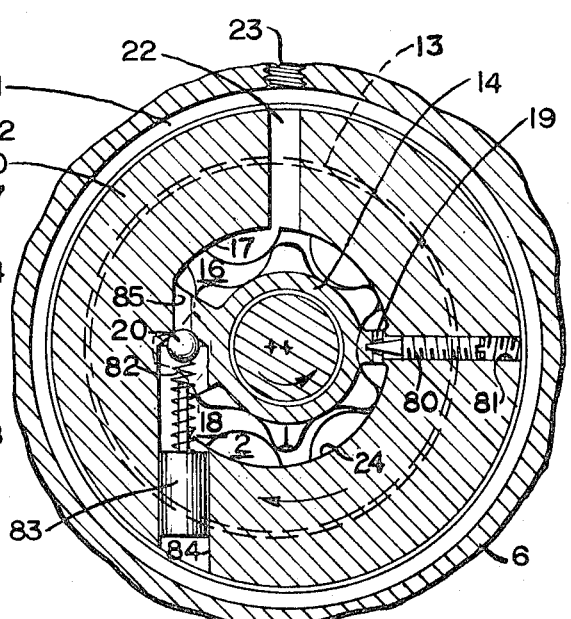
FIG. 9 is a sectional view taken along line 9-9 in FIG. 8, looking in the direction of the arrows.

FIGS. 8 and 9 show a drive similar to that of FIGS. 6 and 7, but having a speed control and braking device built into the drive. Parts similar to those of the preceding embodiments are accordingly correspondingly numbered. Rotation of the input hub 14 and the ring member 10 produces orbital motion of the gears 2 and 4, and consequently rotation of the output gear 1 and the shaft 5, as before. The tooth spaces between the gears 1 and 2 are, however, used as hydraulic expansible-chamber device for the purpose of speed control and braking. A sealing plate 15 affixed to the housing member 8 is interposed between the stationary reacting gear 3 and the output gear 1, and bears axially against the faces of the gears 1 and 2 to seal the tooth spaces against leakage. Annular seals of low-friction material may be used to limit the friction between the parts.

Fluid is supplied to the system through an inlet 23, and a reservoir 21 formed in the housing member 6 circumferentially about the ring member 10 provides fluid as required to compensate for expansion or leakage. The ring member is formed with two arcuate ports 17 and 24, of which the port 24 continually communicates with those tooth chambers 18 which are in the process of contracting, and the port 17 continually communicates with those tooth chambers 16 which are currently expanding. It should be noted that the rotation of the ring member 10 and its ports 24 and 17 follows and is in phase with the orbital motion of the gears 2 and 4; therefore, the port 24 maintains communication with only those pockets 18 which are contracting at any time, and the port 17 follows and keeps pace with the expanding pockets 16. Each pocket expands and contracts through a full cycle on each orbit of the gears 2 and 4, as it is carried from one tooth of the gear 1 to the next in the direction of rotation shown by the arrow in FIG. 9.

The radial width across the ports 24 and 17 is not uniform, but is varied as shown in FIG. 9 in such manner that the ports overly substantially the entire cross section of each tooth space. This permits a free flow of fluid between these tooth spaces and the ports. The ports 17 and 24 are sealed at their free axial faces, opposite the gears 1 and 2, by the rubbing contact of the ring 10 against the body member 6. An annular seal of low-friction material may be interposed. The port 17 communicates with the reservoir 21 by means of a radial passage 22, through which the system is maintained full of fluid by the reservoir.

The characteristics of contraction of tooth pockets in the region 18 and of expansion of the tooth pockets in the region 16 depend upon the rotation of the ring member in the direction shown by the arrow in FIG. 9. The construction illustrated is arranged to provide braking and speed control only in this direction of input rotation, and to permit free rotation if the direction of rotation of the ring is reversed. To this end, a ball-check valve 20 normally closes a port 85 arranged to connect the enlarged ends of the ports 17 and 24. The ball is biased into seating position by a compression spring 82 mounted on a plug 83, which is removably secured in a tangential opening 84 through the ring member 10 for convenience in cleaning the valve. If the ring 10 is rotated in a direction opposite to that shown by the arrow, the fluid compressed in the now-contracting chambers 16 flows freely through the ball valve 20 into the now-expanding chambers 18, by way of the ports 17 and 24; thus, the drive is free to rotate without hydraulic speed control.

However, rotation in the direction shown by the arrow is controlled by means of a restricted orifice 19, which interconnects the ports 17 and 24 at their smaller ends and whose area is adjustable by means of a needle valve 80 threaded into a radial opening 81 in the ring 10 for convenient adjustment. Since the chambers in the region 18 contact when the ring is rotated in the illustrated direction, the ball valve 20 is firmly seated by the compressed fluid, which may pass from the port 24 to the port 17 and the expanding tooth chambers in the region 16 only through the restricted orifice 19. The pressure drop across this orifice converts mechanical energy into heat, which is dissipated into the fluid and the housing; a braking force is therefore applied to the gears.

It will be apparent that speed control and braking can be obtained in either direction of rotation of the ring member 10 by eliminating the check valve 20 and the relief port 85, thereby closing off communication between the ports 17 and 24 through any other path than the restricted orifice 19.

Figures 10, 11:
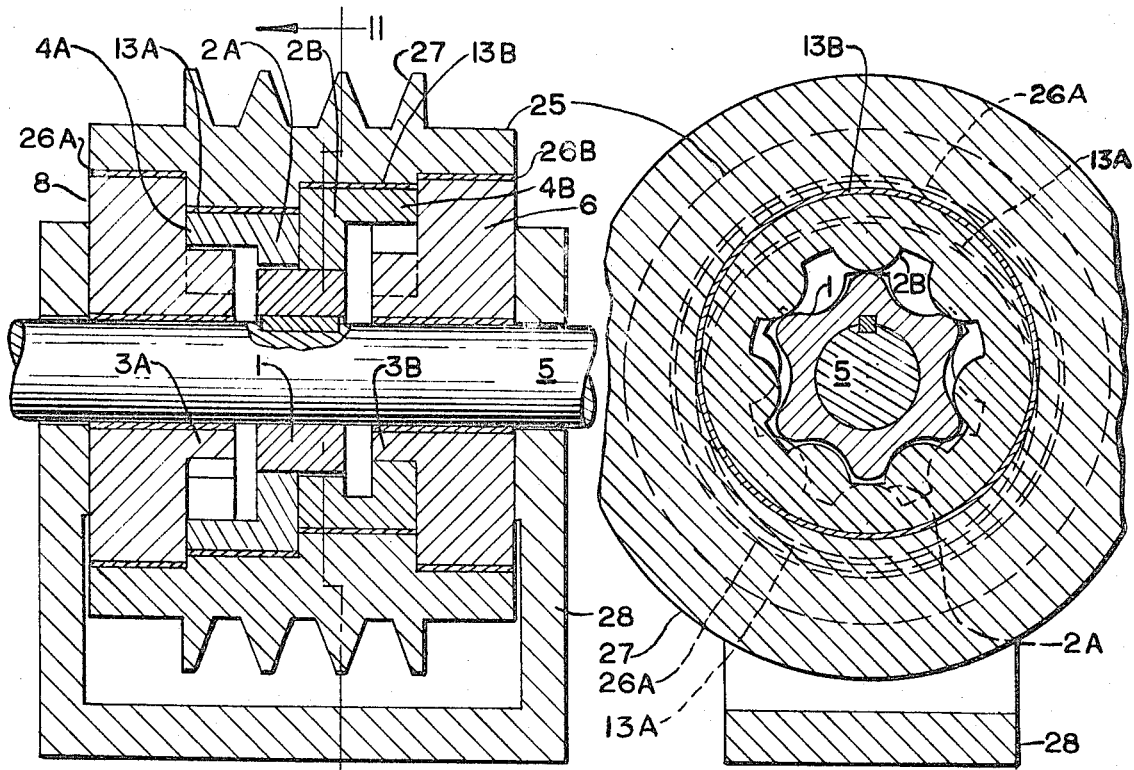
FIG. 10 is a sectional view in side elevation showing a construction having a mechanical input by means of a belt drive, and including a duplex set of gears.
FIG. 11 is a sectional end view taken along 11-11 in FIG. 10, looking in the direction of the arrows.
Figure 12:
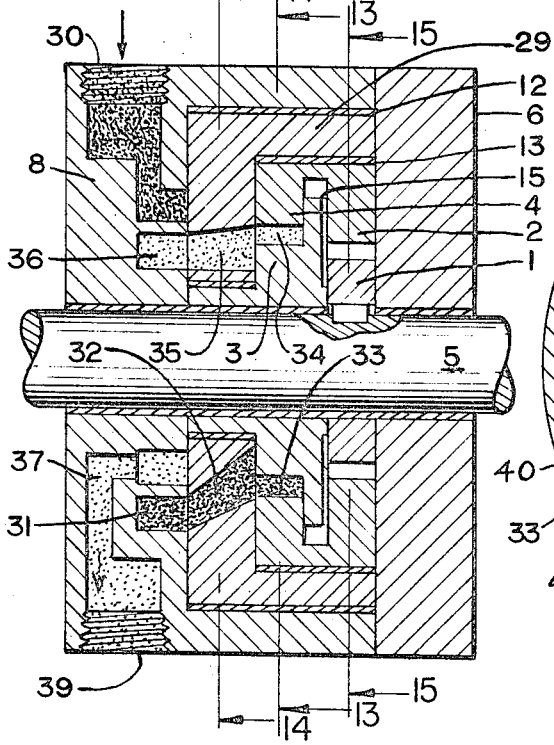
FIG. 12 is a sectional view in side elevation showing an embodiment of the orbital drive in an hydraulic motor.
Figure 13:
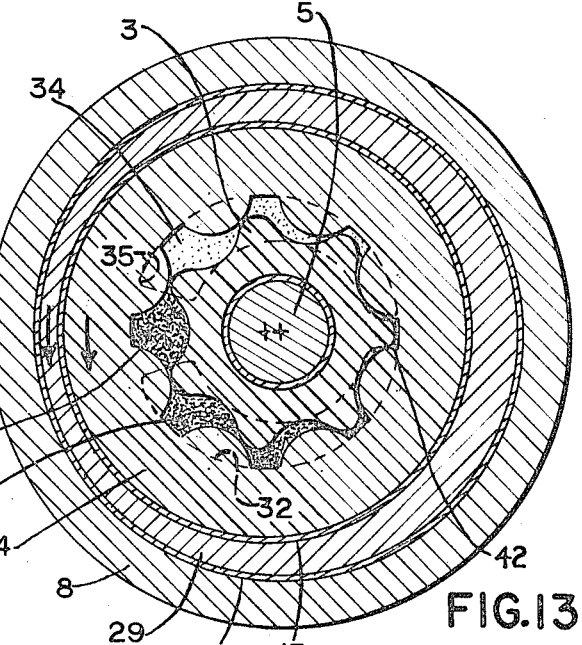
FIG. 13 is a sectional end view taken along line 13-13 in FIG. 12, looking in the direction of the arrows.
Figure 14:
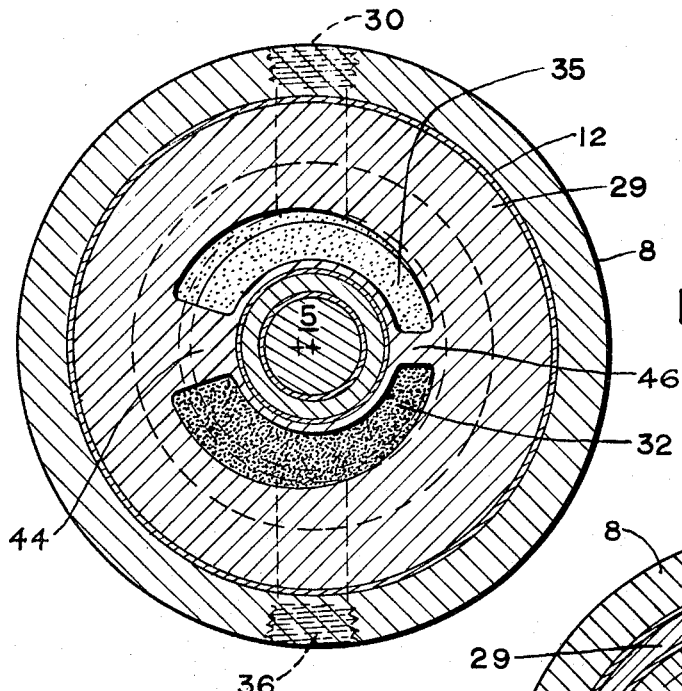
FIG. 14 is a sectional end view taken along line 14-14 in FIG. 12, looking in the direction of the arrows.
Figure 15:
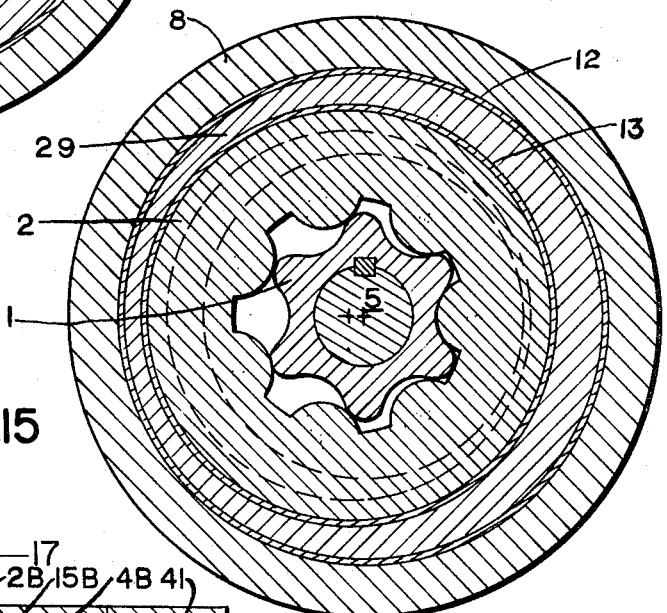
FIG. 15 is a sectional end view taken along line 15-15 in FIG. 12, looking in the direction of the arrows.

FIGS. 10 and 11 illustrate a gear arrangement similar to that of FIG. 4, having a duplex set of drive gears, together with a mechanical power input comprising an annular ring 25, which forms multiple sheaves 27 having grooves for receiving driving V-belts. The ring is rotatably mounted in the housing parts 6 and 8, concentric with the shaft 5, by means of bearings 26a, 26b, which may be antifriction types, and may include thrust elements if desired. The gears 2a, 4a, and 2b, 4b, are rotatably received with a 180° phase relation in eccentric openings in the ring 25, as in previous embodiments, and suitable bearings 13a, 13b are employed as before. This unit has its housing elements 6 and 8 fixed by means not illustrated in a U-shaped mounting bracket 28, which is convenient for use with a V-belt input drive. The unit functions substantially like that shown in FIGS. 6 and 7, but the use of duplex gears increases its torque-carrying capacity, and balances the bending loads applied to the shaft 5.

FIGS. 12—15 show an hydraulic motor or pump incorporating the orbital drive. Parts similar to those of the construction shown in FIG. 6 are similarly numbered. In use as a motor, motive fluid is supplied under pressure through an inlet port 30 from a suitable source (not shown), and distributed by means of a circular groove 31 in the housing member 8. The ring member 29 is in this case driven by the orbital motion of the outer orbiting gears 2 and 4, rather than driving them. For that reason it is necessary that the bearing 12 between the ring and the housing member 8, and also the bearing 13 between the ring and the orbiting gears, be of antifriction types. The gears 2 and 4 rotate at a very much slower rate than the ring 29; this speed ratio is $1/N4$, in which $N4$ is the number of teeth of the outer gear 4.

The ring 29 acts as a distributor or port plate for distributing and exhausting the pressure fluid to and from chambers formed between the teeth of the gears 3 and 4. Pressure fluid is delivered from the groove 31 through an arcuate port 32 in the ring 29 to a group 33 of the tooth chambers. The introduction of pressure fluid causes the gear 4 to rotate in a direction which permits these chambers to expand, and this direction is shown by an arrow in FIG. 13. The rotation of the gear 4 around the stationary gear 3 also results in orbital motion, which rotates the ring 29 in the same angular direction, but at a speed ratio relative to the gear 4 of $N4/1$. In the course of each displacement of the gear 4 through an arc equal to one tooth space, each pocket formed between adjacent contacting pairs of teeth of the gears 3 and 4 completes one full cycle of expansion and contraction. One full revolution of the ring 29 is also completed. Thus, the arcuate port 32 communicates with any one tooth chamber only during a portion of each revolution of the ring 29, when that particular chamber is undergoing expansion. An arcuate exhaust port 35 in the ring 29 communicates with a group 34 of chambers which are in the process of contraction, and exhausts fluid therefrom to a circular groove 36 formed in the housing member 8, which in turn drains through a passage 37 to an outlet port 39. Each of the ports 32 and 35 occupies somewhat less than a 180° arc around the ring 29.

Each of the expanding chambers reaches its maximum volume as it passes out of communication with the port 32 and is about to overlap the port 35. A chamber in this condition is indicated at 40. After contracting fully while draining to the port 35, each chamber becomes completely closed as it passes away from this port and is about to overlap the port 32 once again. One such chamber is indicated at 42. During each revolution of the ring 29, each chamber passes through one complete cycle of expansion and contraction, and the ports of the ring alternately pressurize and exhaust the chamber; the pair of teeth of the gear 4 forming each chamber, however, pass through an arc equal to only one tooth of this gear.

The tooth chambers must be prevented from communicating simultaneously with both ports 32 and 35, to avoid a bypass leakage of pressure fluid. In view of the greater arc length of a chamber at 40 than at 42, the uninterrupted area 44 of the ring 29 (see FIG. 14) underlying the former chamber and separating the ports must occupy a greater arc length than the corresponding area 46 beneath the latter chamber.

The pressure fluid is confined to the tooth chambers 33 and 34 between the gears 3 and 4 by means of a sealing disc 15, which extends circumferentially about the periphery of the gear 3 and bears against an axial face of the gear 4. An annular antifriction seal may be provided between the disc 15 and the gear 4 to prevent excessive leakage of the pressure fluid into the tooth spaces between the gears 1 and 2, and to reduce friction. It is important that pressure fluid not be allowed to accumulate between the gears 1 and 2, since this would tend to apply a braking force. Either an adequate sealing means, or else suitable ports for draining these tooth spaces through the housing member 6, may be provided. If substantial fluid pressures are involved, it may also prove desirable to provide thrust bearings for the gear 3 and the ring 29; otherwise the pressure fluid may apply substantial axial contact pressures between the relatively rotating elements.

The displacement of the motor per revolution of the orbiting gear 4 is equal to the cross-sectional area of the tooth chambers multiplied by their length; i.e. the difference between the area enveloped by the teeth of the gear 4 and the portion of this area filled by the gear 3, multiplied by the thickness of these gears. The displacement per revolution of the output gear 1 and shaft 5 can be found by multiplying the above displacement value by the speed reduction ratio of the gear 1 to the gear 4, which may be expressed as, $N4[1-(N3 \times N2/N4 \times N1)]$, gear tooth numbers being designated as before.

It will be apparent that the unit of FIGS. 12—15 may be used to pump fluid by driving the ring 29. If it is driven in the same angular direction shown in FIG. 13, fluid may be drawn from a source connected to the port 39, and delivered under pressure to the port 30.

Figure 16:
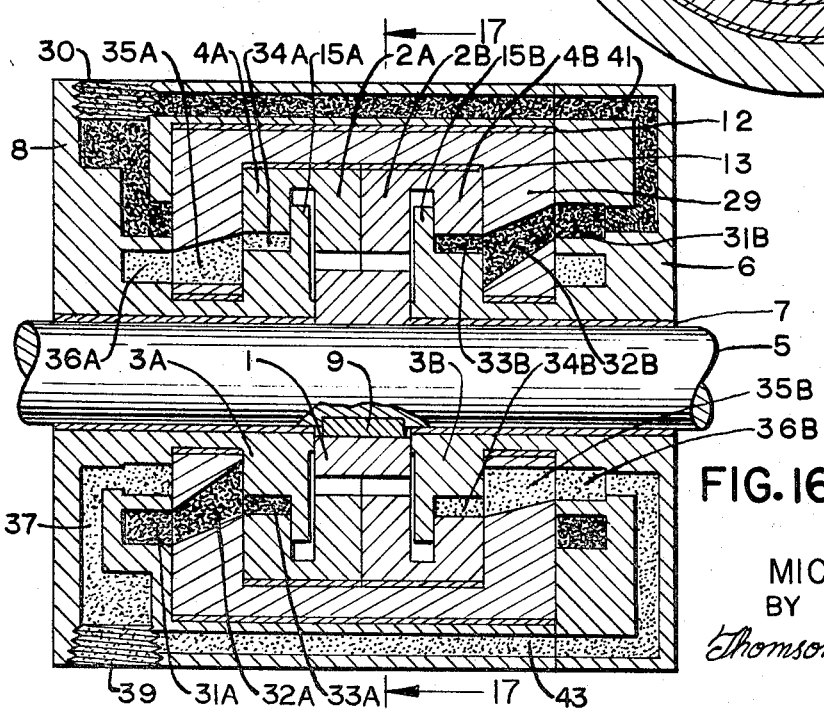
FIG. 16 is a sectional view in side elevation showing an embodiment of the drive in an hydraulic motor similar to that of FIG. 12, but incorporating duplex sets of drive gears.
Figure 17:
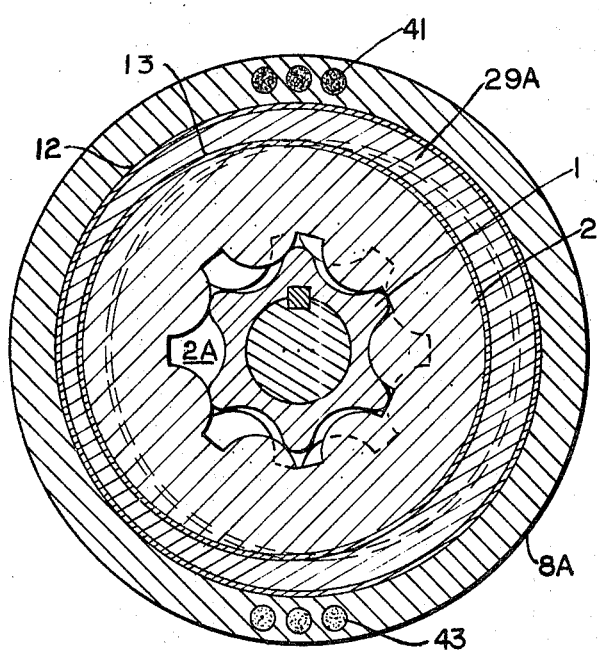
FIG. 17 is a sectional end view taken along line 17-17 in FIG. 16, looking in the direction of the arrows.

FIGS. 16 and 17 illustrate an hydraulic motor or pump incorporating duplex sets of orbital drive gears. Parts similar to those of the motor of FIGS. 12—15 are similarly numbered, with the suffixes $a$ and $b$ designating duplicate members and parts of each of the two sets. The unit functions substantially in the same manner as that of FIGS. 12—15, but the duplication of the gear sets doubles the output power derived from a fluid supply of a given pressure, at twice the flow rate. The two gear sets are angularly positioned 180° out of phase, and the duplex ring member 29 has its corresponding ports 35$a$, 35$b$, and 32$a$, 32$b$, similarly phased. This balances the bending loads applied to the shaft 5 by the two sets. It is desirable to insert thrust bearings (not shown) between those relatively rotating parts which are otherwise pressed into rubbing contact by the pressure fluid. In order to supply and exhaust fluid from the drive set whose parts carry the suffix $b$, the annular fluid supply groove 31$b$ is connected with the pressure fluid inlet 30 by means of a plurality of passages 41 bored longitudinally through the housing portion 8. Similarly, the annular exhaust fluid groove 36$b$ is connected with the outlet 39 by means of a series of passages 43 bored longitudinally through the housing member 8.

Figure 18:
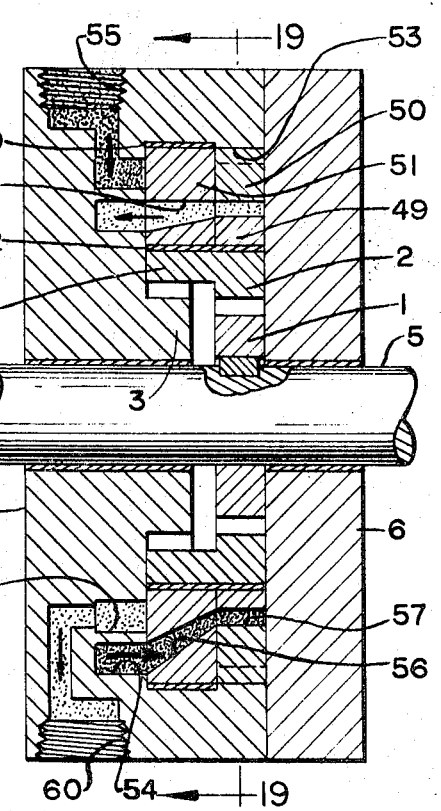
FIG. 18 is a sectional view in side elevation showing an embodiment of the drive which incorporates a separate hydraulic motor to produce oscillation of a ring member which is concentric with the orbiting gears, and an eccentric ring distributor.
Figure 19:
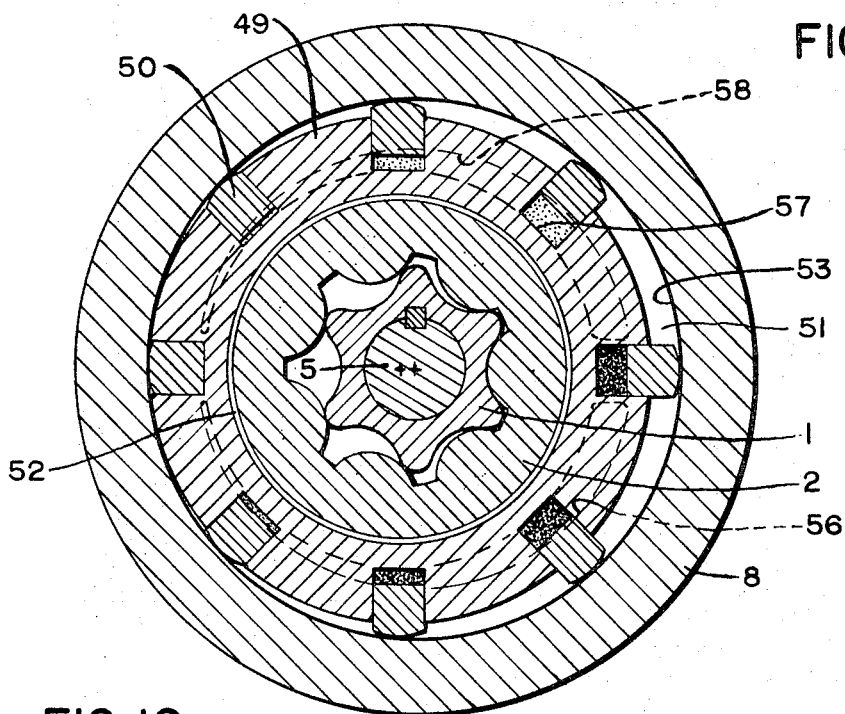
FIG. 19 is a sectional end view taken along line 19-19 in FIG. 18, looking in the direction of the arrows.

FIGS. 18 and 19 show an orbital drive incorporating an hydraulic motor or pump comprising an orbiting but nonrotating drive ring 49 formed peripherally with a series of circumferentially-spaced parallel-walled slots 57 which pass axially through this member and are enclosed by a distributor ring 51 and housing member 6. These slots act as cylinders, and receive pistons 50. The ring 51 acts as a fluid distributor or port plate for alternatively pressurizing and exhausting the slots or cylinders 57, to produce orbital motion of the annulus 49 and gears 2 and 4, and consequent rotation of the ring 51. An inlet port 55 in the housing 8 receives fluid under pressure from a suitable supply source, and delivers the fluid by means of a circular groove 54 to an arcuate port 56 formed in the ring 51. The port 56 in turn delivers the pressure fluid to a group of the cylinders 57, whose pistons 50 are thereby extended radially to act against an internal cylindrical surface 53 in the housing member 8. At the same time, an arcuate exhaust port 58 in the ring 51, circumferentially spaced apart from the port 56, drains fluid from another group of the cylinders 57 into a circular groove 61 in the housing 8, and thence to an exhaust port 60. The action of the pistons 50 causes the drive ring 49 to orbit about the axis of the output shaft 5 in a counterclockwise direction as viewed in FIG. 19.

The drive ring 49 receives the peripheries of the gears 2, 4 concentrically within a bearing 52, which is preferably of an antifriction type, and thus produces an orbital motion of these gears to drive the output gear 1 and the shaft 5. The ring 51 receives the gears 2, 4 eccentrically therein as in other embodiments, with an antifriction bearing 52 interposed to facilitate relative rotary motion. The ring 51 is rotatably mounted in the housing 8, concentric with the axis of the shaft 5, by means of another antifriction bearing 59.

The oscillation and resulting rotation of the gears 2, 4 produces rotation of the ring 51 at the increased speed ratio $N4/1$, $N4$ being the number of teeth of the gear 4. The oscillatory motion of the drive ring 49 thus indirectly drives the distributor ring 51, and the rotation of the ports 56 and 58 alternately pressurizes and drains the cylinders 57 to produce orbital motion of the drive ring and the gears 2, 4 at a speed which is inherently synchronized with the speed of rotation of the distributor ring.

Figure 20:
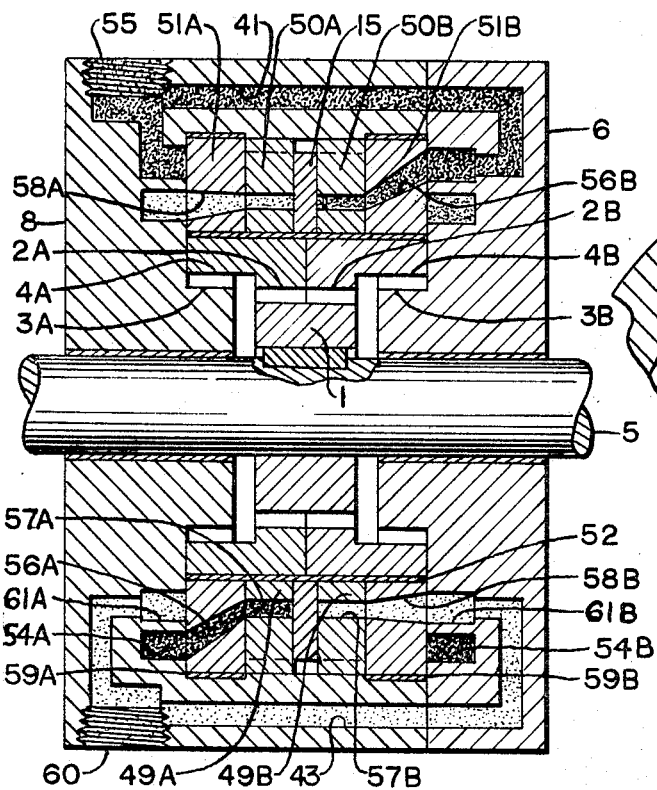
FIG. 20 is a sectional view in side elevation of an embodiment similar to that of FIG. 18 but involving duplex sets of drive gears.

FIG. 20 shows an embodiment similar to that of FIG. 18, but having duplex sets of drive gears, each with its own hydraulic drive ring 49a or 49b, and distributor ring 51a or 51b. Parts similar to those of FIG. 18 are similarly numbered, with the suffix a or b, designating like elements of the duplex sets. The two sets of gears are angularly positioned 180° out of phase in order to balance the bending loads on the shaft 5. It is necessary to separate the drive rings 49a and 49b by means of a sealing ring 15 in order to separate their respective, out-of-phase groups of pressurized and exhausted cylinders 57a and 57b. Fluid connections with the ports 56b and 58b of the ring 51b, at the right side of FIG. 20, are made through passages 41 and 43, each extending longitudinally through the housing members 8 and 6 into communication with the appropriate inlet or outlet port 55 or 60. The operation of the device is similar to that of FIG. 18, but the duplication of drive units provides a doubling of power output with the same input pressure, at twice the flow rate. The duplication of units also balances the bending loads on the shaft 5.

Figure 21:
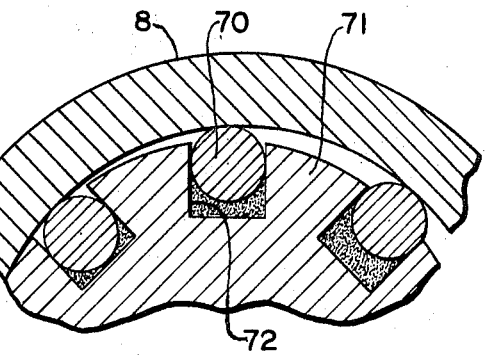
FIG. 21 is a fragmentary sectional end view of a modified hydraulic motor for oscillating the ring member of FIG. 18.

An alternative form of hydraulic input drive, which may be used in place of that shown in FIGS. 19 and 20, is illustrated in FIG. 21. A drive ring 71 is here formed with circumferentially-spaced cylinders 72 of circular cross section, which receive a series of ball pistons 70. The drive motor is otherwise similar to that shown in FIGS. 18 and 19, and cooperates with the drive gears in a similar fashion.

Figure 23:
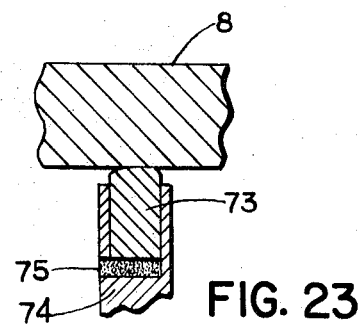
FIG. 23 is a fragmentary sectional view in side elevation of the hydraulic motor of FIG. 22.
Figure 22:
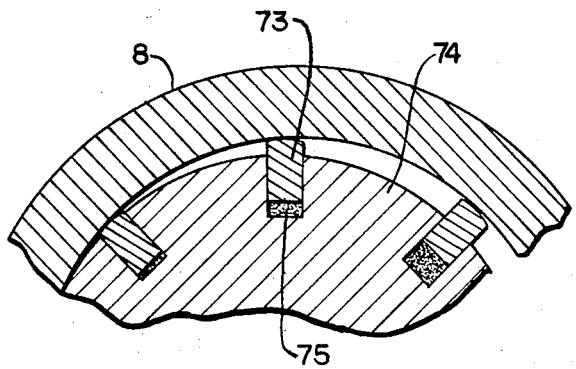
FIG. 22 is a view similar to FIG. 21, but showing a further modification of the hydraulic motor.

Still another construction of the drive motor is shown in FIGS. 22 and 23, in which the cylinders 75 and pistons 73 are also circular in section, rather than having parallel sides extending completely through the axial thickness of the drive ring 74. The cylinders 75 are ported through one face of the ring 74 near their bases. Similar porting should be provided for the cylinders 72 of FIG. 21.

While I have illustrated and described preferred embodiments of my invention, it will be apparent to those skilled in the art that various changes and modifications may be made therein without departing from the true spirit and scope of the invention, which I intend to define in the appended claims without limitation to the details of the illustrated embodiments.

I claim:

1. An orbital drive comprising a reacting externally-toothed gear; means stationarily supporting said reacting gear on an output axis; an output externally-toothed gear; means supporting said output gear for rotation about said output axis; a first orbiting internally-toothed gear surrounding said reacting gear in eccentric relation thereto, said first orbiting gear having a larger number of teeth than said reacting gear and meshing therewith; a second orbiting internally-toothed gear surrounding said output gear in eccentric relation thereto, said second orbiting gear having a larger number of teeth than said output gear and meshing therewith; the respective meshing teeth of said reacting gear and said first orbiting gear being formed relative to one another to maintain a continuous line of sliding contact therebetween; the respective meshing teeth of said output gear and said second orbiting gear being formed relative to one another to maintain a continuous line of sliding contact therebetween; and means drivingly interconnecting and orienting said first and second orbiting gears for orbital motion of the axes thereof about said output axis.

2. An orbital drive as recited in claim 1, said first orbiting gear having one more tooth than said reacting gear, and said second orbiting gear having one more tooth than said output gear.

3. An orbital drive as recited in claim 2, said first orbiting gear having a different number of teeth than said second orbiting gear.

4. An orbital drive as recited in claim 1, said first and second orbiting gears being fixed together with equal eccentricity to said output axis.

5. An orbital drive as recited in claim 1, the teeth of said reacting and output gears respectively cooperating with the teeth of the orbiting gears meshing in sliding contact therewith to form chambers which alternately expand and contract during rotation of the gears, together with means enclosing the ends of at least some of said chambers against fluid leakage and connecting the enclosed chambers alternately with fluid pressure conduit means for fluid pumping by said gears or fluid driving thereof.

6. An orbital drive comprising a reacting externally-toothed gear; means stationarily supporting said reacting gear on an output axis; an output externally-toothed gear; means supporting said output gear for rotation about said output axis; a first orbiting internally-toothed gear surrounding said reacting gear in eccentric relation thereto, said first orbiting gear having a larger number of teeth than said reacting gear and meshing therewith; a second orbiting internally-toothed gear surrounding said output gear in eccentric relation thereto, said second orbiting gear having a larger number of teeth than said output gear and meshing therewith; the respective meshing teeth of said reacting gear and said first orbiting gear being formed relative to one another to maintain a continuous line of sliding contact therebetween; the respective meshing teeth of said output gear and said second orbiting gear being formed relative to one another to maintain a continuous line of sliding contact therebetween; means drivingly interconnecting said first and second orbiting gears for orbital motion of the axes thereof about said output axis; and a ring member rotatable about said output axis and having eccentric driving connection with said orbiting gears, whereby rotation of said ring member is accompanied by orbital motion of said orbiting gears about said output axis.

7. An orbital drive as recited in claim 6, at least one of said orbiting gears being formed with a circular external surface, said ring member being formed with a circular internal opening eccentric to said output axis and cooperating with said circular external surface of said orbiting gear to form said eccentric driving connection.

8. An orbital drive as recited in claim 6, the teeth of said reacting and output gears respectively cooperating with the teeth of the orbiting gears meshing in sliding contact therewith so that said teeth form chambers which alternately contract and expand during rotation of said gears, said ring member being formed with arcuate ports arranged to connect said chambers alternately with fluid conduit means for exhausting fluid from said chambers or admitting fluid thereto, whereby said gears form a fluid pump or motor.

9. An orbital drive as recited in claim 8, said ring member being formed with two arcuate ports each extending through an arc of less than 180° and being circumferentially spaced apart by two arcuate surface portions each of an arc length sufficient to completely cover at least one of said chambers to prevent direct communication between said ports through any tooth chamber.

10. An orbital drive as recited in claim 6, together with a further ring member having a circular opening, at least one of said orbiting gears having a circular peripheral surface received in relatively rotatable relation in said opening for joint orbital motion of said further ring member and said orbiting gears.

11. An orbital drive comprising a reacting externally-toothed gear; means stationarily supporting said reacting gear on an output axis; an output externally-toothed gear; means supporting said output gear for rotation about said output axis; a first orbiting internally-toothed gear surrounding said reacting gear in eccentric relation thereto, said first orbiting gear having a larger number of teeth than said reacting gear and meshing therewith; a second orbiting internally-toothed gear surrounding said output gear in eccentric relation thereto, said second orbiting gear having a larger number of teeth than said output gear and meshing therewith; said first and second orbiting gears being drivingly interconnected and arranged for orbital motion of the axes thereof about said output axis; a ring member rotatable about said output axis and having eccentric driving connection with said orbiting gears, whereby rotation of said ring member is accompanied by orbital motion of said orbiting gears about said output axis; a further ring member having a circular opening, at least one of said orbiting gears having a circular peripheral surface received in relatively rotatable relation in said opening for joint orbital motion of said further ring member and said orbiting gears; together with a housing member formed with a circular internal surface concentric with said output axis and extending circumferentially about said further ring member in eccentric relation thereto, said further ring member being formed peripherally with a plurality of circumferentially-spaced cylinders, and a plurality of pistons received slidably and conformably in said cylinders for engagement with said internal surface to form a motor or pump operable with said orbital drive.

12. An orbital drive as recited in claim 11, said first-mentioned ring member being axially adjacent to said further ring member to overly said cylinders and being formed with arcuate ports arranged to connect said cylinders alternately with different fluid conduit means for exhausting or admitting fluid to said cylinders, said cylinders forming communication with said arcuate ports through an axial surface of said further ring member.

13. An orbital drive comprising a reacting externally-toothed gear; means stationarily supporting said reacting gear on an output axis; an output externally-toothed gear; means supporting said output gear for rotation about said output axis; a first orbiting internally-toothed gear surrounding said reacting gear in eccentric relation thereto, said first orbiting gear having a larger number of teeth than said reacting gear and meshing therewith, a second orbiting internally-toothed gear surrounding said output gear in eccentric relation thereto, said second orbiting gear having a larger number of teeth than said output gear and meshing therewith; the respective meshing teeth of said reacting gear and said first orbiting gear being formed relative to one another to maintain a continuous line of sliding contact therebetween; the respective meshing teeth of said output gear and said second orbiting gear being formed relative to one another to maintain a continuous line of sliding contact therebetween; means drivingly interconnecting said first and second orbiting gears for orbital motion of the axes thereof about said output axis; a ring member having a cylindrical opening eccentric in relation thereto, at least one of said orbiting gears having a cylindrical peripheral surface received in relatively rotatable relation in said opening for joint orbital motion of said ring member and said orbiting gears; a housing containing said gears; and means mounting said ring member in relation to said housing for angular motion about said output axis.

14. An orbital drive comprising a reacting externally-toothed gear; means stationarily supporting said gear on an output axis; an output externally-toothed gear; means supporting said output gear for rotation about said output axis; a first orbiting internally-toothed gear surrounding said reacting gear in eccentric relation thereto, said first orbiting gear having a larger number of teeth than said reacting gear and meshing therewith; a second orbiting internally-toothed gear surrounding said output gear in eccentric relation thereto, said second orbiting gear having a larger number of teeth than said output gear and meshing therewith; said first and second orbiting gears being drivingly interconnected and arranged for orbital motion of the axes thereof about said output axis; a ring member having a circular opening, at least one of said orbiting gears having a circular peripheral surface received in relatively rotatable relation in said opening for joint orbital motion of said ring member and said orbiting gears; a housing member formed with a circular internal surface concentric with said output axis and extending circumferentially about said ring member in eccentric relation thereto; said ring member being formed peripherally with a plurality of circumferentially-spaced cylinders; and a plurality of pistons received slidably and conformably in said cylinders for engagement with said internal surface to form a motor or pump operable with said orbital drive.

15. An orbital drive as set forth in claim 13 wherein said mounting means mounts said ring member for rotation about said output axis, wherein both of said orbiting gears have cylindrical peripheral surfaces recieved in relatively rotatable relation in cylindrical opening surfaces in said ring member, and further comprising means drivingly connected with said ring member and extending outside said housing for rotating said ring member about said output axis.

16. An orbital drive as set forth in claim 1 further comprising a third orbiting internally-toothed gear surrounding and meshing with said output gear in eccentric relation thereto, said third orbiting gear having the same number of teeth as said second orbiting gear; a second reacting externally-toothed gear having the same number of teeth as said reacting gear; means stationarily supporting said second reacting gear on said output axis; and a fourth orbiting internally-toothed gear surrounding and meshing with said second reacting gear in eccentric relation thereto, said fourth orbiting gear having the same number of teeth as said first orbiting gear; the respective meshing teeth of said second reacting gear, output gear, third orbiting gear and fourth orbiting gear being formed relative to one another to maintain a continuous line of sliding contact therebetween; said second reacting gear and third and fourth orbiting gears being disposed in axially-displaced symmetrical relation to said reacting gear and first and second orbiting gears in a duplex arrangement, said third and fourth orbiting gears being disposed about said output axis with eccentricities 180° out of phase with the eccentricities of said first and second orbiting gears, whereby to increase the torque capacity and to balance the loading of said drive.

17. An orbital drive as set forth in claim 6, the teeth of said reacting and output gears respectively cooperating with the teeth of the orbiting gears meshing in sliding contact therewith to form chambers which expand and contract during rotation of said gears, said ring member being formed with a pair of arcuate ports respectively arranged to communicate continually with those chambers which are respectively expanding and contracting, means for connecting said ports in fluid communication, and means controlling fluid flow in said connecting means, whereby to control speed or braking of said drive.